US012087527B2

(12) United States Patent
Maquet

(10) Patent No.: US 12,087,527 B2
(45) Date of Patent: Sep. 10, 2024

(54) SWITCHING DEVICE ON AN ELECTRIC LINE COMPRISING A VACUUM INTERRUPTER

(71) Applicant: Schneider Electric Industries SAS, Rueil Malmaison (FR)

(72) Inventor: Patrick Maquet, Claix (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 176 days.

(21) Appl. No.: 18/074,640

(22) Filed: Dec. 5, 2022

(65) Prior Publication Data

US 2023/0187151 A1 Jun. 15, 2023

(30) Foreign Application Priority Data

Dec. 13, 2021 (FR) ...................................... 2113376

(51) Int. Cl.
*H01H 1/14* (2006.01)
*H01H 31/00* (2006.01)
(Continued)

(52) U.S. Cl.
CPC .......... *H01H 33/6661* (2013.01); *H01H 1/14* (2013.01); *H01H 31/003* (2013.01); *H01H 33/662* (2013.01); *H01H 33/6664* (2013.01)

(58) Field of Classification Search
CPC ............. H01H 33/6661; H01H 33/662; H01H 33/6664; H01H 33/666; H01H 33/52; H01H 31/003; H01H 1/14
(Continued)

(56) References Cited

U.S. PATENT DOCUMENTS 3,098,915 A * 7/1963 Chabala ................. H01H 33/91 218/12
3,602,668 A * 8/1971 Krajewski ............ H01H 33/124 218/8
(Continued)

FOREIGN PATENT DOCUMENTS

EP 2182536 B1 6/2012
EP 2927926 A1 10/2015
(Continued)

OTHER PUBLICATIONS

French Search Report and Written Opinion dated Jul. 11, 2022 for corresponding French Patent Application No. 2113376, 11 pages.

*Primary Examiner* — William A Bolton
(74) *Attorney, Agent, or Firm* — Locke Lord LLP

(57) ABSTRACT

A current switch including a main contact including an electrically conductive knife, and an electrically insulating element, fitted in a mobile manner on a first portion of electric line in order to alternatively follow an opening movement and a closing movement; a shunt branch including a first part electrically connected to a second portion of the line, including a vacuum interrupter configured to be actuated alternatively between an open state and a closed state, a second part fitted in a mobile manner on the first part and configured to actuate the vacuum interrupter. During the opening movement, the electrically conductive knife acts upon the second part in order to actuate the vacuum interrupter, and during the closing movement, the electrically insulating element acts upon the second part without actuating the vacuum interrupter.

15 Claims, 10 Drawing Sheets

(51) Int. Cl.
*H01H 33/662* (2006.01)
*H01H 33/666* (2006.01)

(58) Field of Classification Search
USPC ..... 218/118, 3, 4, 5, 6, 8–12, 140, 120, 121, 218/153, 154; 200/48 KB, 48 R
See application file for complete search history.

(56) References Cited

U.S. PATENT DOCUMENTS

| | | | | |
|---|---|---|---|---|
| 3,824,359 | A * | 7/1974 | Date | H01H 33/127 218/10 |
| 4,591,678 | A * | 5/1986 | Yin | H01H 33/128 218/121 |
| 8,476,546 | B2 * | 7/2013 | Abroy | H01H 21/56 200/18 |
| 9,679,721 | B2 * | 6/2017 | Rhein | H01H 33/42 |
| 2002/0066655 | A1 * | 6/2002 | Theaudiere | H01H 9/104 200/47 |
| 2009/0020506 | A1 * | 1/2009 | Kuntze | H01H 31/003 218/3 |
| 2010/0102035 | A1 | 4/2010 | Piccoz et al. | |
| 2012/0187090 | A1 * | 7/2012 | Grosjean | H01H 33/126 218/140 |
| 2017/0018381 | A1 * | 1/2017 | Abrahamsen | H01H 33/6661 |

FOREIGN PATENT DOCUMENTS

| | | | |
|---|---|---|---|
| EP | 3929955 | A1 | 12/2021 |
| ES | 1275577 | U | 7/2021 |
| WO | 2006074975 | A1 | 7/2006 |

* cited by examiner

SWITCHING DEVICE ON AN ELECTRIC LINE COMPRISING A VACUUM INTERRUPTER

TECHNICAL FIELD

The present disclosure relates to the field of current switches fitted on an electric line or cable. The present disclosure relates more precisely to current switches comprising a vacuum interrupter.

PRIOR ART

A high or medium voltage electric line is currently equipped with a switch, or circuit breaker. The electric line is intended for transmitting a current in a distribution network, from a voltage source to a consumer or an electric load. The switch makes it possible to cut off or to establish the current passing through the line by opening or, on the contrary, by closing the line.

Conventionally, the switch comprises two contacts that are mutually mobile between a joined position, corresponding to the line being closed, and a separated position, corresponding to the line being open. During separation, the two contacts are separated in an insulating medium contained in a tank, in order to extinguish an electric arc becoming established during the separation of the contacts.

On medium voltage and high voltage lines, the insulating medium is currently sulphur hexafluoride $SF6$. However, this gas has the disadvantage of being a greenhouse gas, the use of which in large quantities is extremely harmful to the environment.

In order to overcome this, there are switches equipped with vacuum interrupters, in which the separation of the contacts takes place in a vacuum. This solution in fact makes it possible to extinguish the electric arc without necessitating the use of polluting gas. However, vacuum interrupters capable of being integrated directly on a line are costly, notably because of the dimensions and of the materials they require in order to comply with the various electric and dielectric conditions, such as the resistance to lightning impulses or the short-circuit making capacity.

The document EP 2 182 536 proposes fitting the vacuum interrupter in a shunt on a main part of the line. A disconnector drives a mobile end of the shunt during an opening movement or a closing movement. During the opening movement, the disconnector makes use of a conductive face of the mobile end to make the current flow into the shunt and then to open the vacuum interrupter. During the closing movement, an insulating face of the mobile end made use of by the interrupter, in order not to make the current flow in the shunt and to leave the vacuum interrupter in the rest state. The vacuum interrupter is left in the rest state during the closing of the line, which allows it to be subjected to lower stresses and reduces the characteristics that it must have, which has a significant impact on its production cost.

However, there is a risk during the closing of the line for certain high voltage levels and during a high number of operations of the switch. When the disconnector comes into contact with the insulating face of the mobile end, as described in the document EP 2 182 536, because of the degradation of the properties of the surface materials, an unwanted current can begin and flow through the shunt, which can damage the vacuum interrupter and the switch.

The aim of the present disclosure is to eliminate the risk of current flowing in the shunt during the closing of the line.

SUMMARY

There is proposed a current switch, arranged between a first portion of electric line and a second portion of electric line, comprising at least one main contact comprising an electrically conductive knife, and an electrically insulating element, the main contact being fitted in a mobile manner on the first portion of electric line in order to alternatively follow an opening movement from a closed position in which the main contact is in electrical contact with the second portion of electric line to an open position in which the main contact is distant from the second portion of electric line, and a closing movement from said open position to said closed position; at least one shunt branch comprising a first part electrically connected to the second portion of the line, the first part comprising a vacuum interrupter configured to be actuated alternatively between an open state and a closed state; a second part mounted in a mobile manner on the first part and configured to actuate the vacuum interrupter, the electrically conductive knife and the electrically insulating element being configured so that: during the opening movement, the electrically conductive knife acts upon the second part in order to actuate the vacuum interrupter into the open state and, during the closing movement, the electrically insulating element acts upon the second part without actuating the vacuum interrupter.

Thus, during a movement of separation, the main contact can drive the mobile part whilst being in electrical contact with the with the shunt, in order to open the vacuum interrupter and ensure the breaking of the current without generating an electric arc. During the closing movement, the main contact can touch the mobile part without being in electrical contact with the shunt, thus avoiding the unwanted flow of current in the shunt. In particular, thanks to the electrically insulating element, the isolating distances (air distance and creepage distance) between the knife and the mobile part of the shunt are increased.

The features described in the following paragraphs can, optionally, be implemented independently of each other or in combination with each other;

the electrically insulating element is a support element of the electrically conductive knife;

the electrically insulating element comprises: a body forming a housing for the knife of the main contact, a free end of the electrically conductive knife protruding from the body; and a protuberance extending from the body, said protuberance being disposed to come into contact with said second part during the closing movement;

the protuberance extends in a plane axially offset from a general plane of extension of the electrically conductive knife;

the protuberance is an integral part of the body;

the protuberance is a part attached to the body;

the second part comprises an electrically conductive face and an electrically insulating face, the electrically conductive face and the insulating face being opposite to each other;

the second part comprises a first arm fitted in a mobile manner on the first part, and a second arm fitted in a mobile manner on a free end of the first arm;

the second arm comprises a protrusion adapted to come into contact with the electrically insulating element during the closing movement;

the shunt branch comprises moreover a stop adapted to keep the second arm in a stopped position in which the second arm extends in the prolongation of the first arm during the opening movement;

the second arm is made of an electrically conductive material;

the main contact is fitted in a pivoting manner on the first portion of the line about a first pivoting axis, the second part of the shunt branch being fitted in a pivoting manner on the first part of the shunt branch about a second pivoting axis, the first pivoting axis being parallel with the second pivoting axis;

the shunt branch comprises a spring fitted between the first part and the second part, the spring being adapted to drive the second part towards a rest position, in which the vacuum interrupter is in the closed state;

the main contact is also adapted to follow an earthing movement from the open position to an earthed position, the knife of the main contact being in electrical contact with an earth when the main contact is in said earthed position.

According to another aspect, there is proposed a three-phase switching device comprising at least one switch.

BRIEF DESCRIPTION OF THE DRAWINGS

Other features, details and advantages will become apparent on reading the following detailed description and on analysis of the appended drawings, in which.

DESCRIPTION OF THE EMBODIMENTS

In the different figures, the same references denote identical or similar elements.

Figure 1:
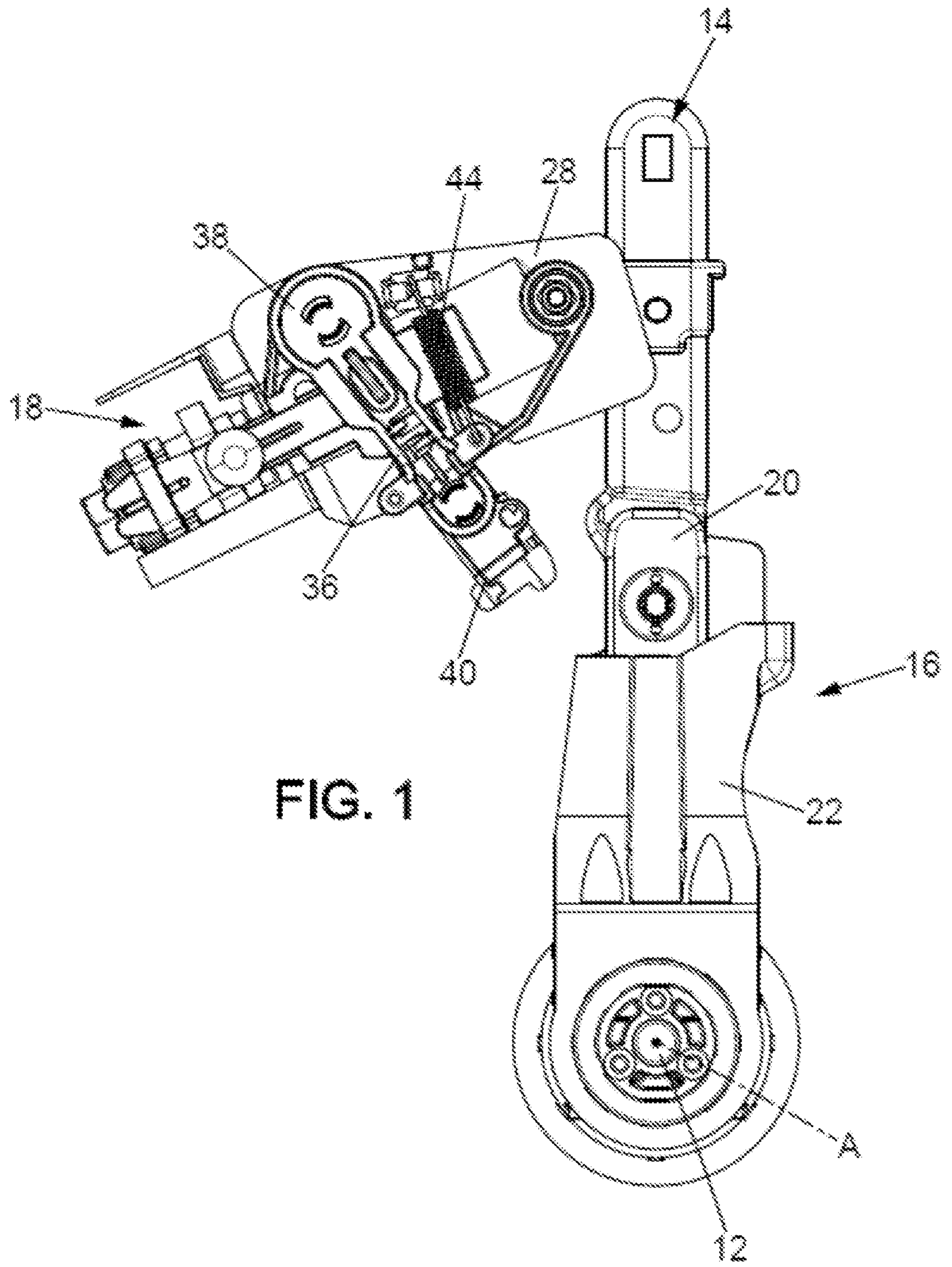
FIG. 1 shows a side view of a switch on a portion of electric line in a closed position, according to one embodiment.

FIG. 1 shows a switch 10 fitted in a medium or high voltage line. In what follows, the expressions "medium voltage" and "high voltage" are used as usually accepted, namely that the expression "medium voltage" denotes a voltage which is higher than 1,000 volts in alternating current and higher than 1,500 volts in direct current but which does not exceed 52,000 volts in alternating current and 75,000 volts in direct current, whereas the expression "high voltage" denotes a voltage which is strictly higher than 52,000 volts in alternating current and higher than 75,000 volts in direct current. Such and electric line is intended for transmitting a current in a distribution network.

It is noted that such a high or medium voltage line generally comprises three phases, that is to say it is three-phase. Thus, the line can comprise three switches 10 such as described below. Each switch 10 can be associated with one of the phases of the electric line. The switches 10 can be housed in a sealed enclosure or tank, notably comprising pressurized air, which allows an economic and compact arrangement of the switches 10.

The switch 10 is fitted between a first portion 12 of the line and a second portion 14 of the line. In the example shown, the first portion 12 extends to a place of consumption, and the second portion 14 goes back to a voltage source. The place of consumption can for example be a public distribution station or an industrial installation. Alternatively, the second portion 14 could go to the place of consumption, and the first portion 12 could go to the voltage source. Alternatively again, the second portion 12 could be connected to the first portion 14, forming an open loop distribution network. The switch 10 can close the line, allowing the flow of current between the two portions 12, 14 of the line. The switch 10 can also open the line, interrupting the flow of current between the two portions 12, 14 of the line.

Moreover, the switch 10 can be disposed in the vicinity of an earth 50. The switch 10 can, in addition to the opening and closing of the line, provide the earthing of the line. The earthing contributes to the safety of personnel in the case of intervention on the line. The switch 10 is then a three-position switch.

The switch 10 essentially comprises a main contact 16 and a shunt branch 18.

The main contact 16 is fitted in a mobile manner on the first portion 12 of the line. An opening movement correspond to the transition of the main contact 16 from a closed position to an open position. In the closed position, the main contact 16 is in electrical contact with the second portion 14 of the line. The line is closed, and the current can pass through the main contact 16 in order to join the second portion 14 of the line. Conversely, in the open position, the main contact 16 is distant from the second portion 14 of the line. The line is open, and the flow of current between the first portion 12 and the second portion 14 of the line is interrupted. Moreover, an earthing movement corresponds to the transition of the main contact 16 from the open position to an earthing position. In the earthing position, the main contact 16 joins the earth 50. Finally, a closing movement corresponds to the return of the main contact 16 to the closed position from the open position.

In this case, the main contact 16 is fitted in a rotary manner about a pivoting axis A. The axis A is substantially perpendicular to the general plane of extension of the main contact 16. Thus, the opening movement corresponds to a rotation of the main contact 16 about the axis A. The earthing movement corresponds to a further rotation of the main contact 16 about the axis A. The closing movement corresponds to a further rotation of the first switch element 16 about the axis A, in the direction opposite to that of the opening movement.

The main contact 16 is driven by an actuator (not shown). The actuator can be disposed in the vicinity of the first portion 12 of the line to drive the opening, closing or earthing movement of the main contact 16.

As shown in FIG. 1, the main contact 16 comprises an electrically conductive knife 20 and an electrically insulating element 22.

The electrically conductive knife 20, also called electrically conductive element, extends between the first and second portions of the line 12, 14 in order to come into contact with the second portion 14 of the line, in the closed position, and the earth 50, in the earthing position. The electrically conductive knife 20 is made from an electrically conductive material. The cross-section of the electrically conductive knife 20 is adapted to establish an electrical contact with the second portion 14 of the line or with the earth 50. Moreover, the area of the cross-section of the electrically conductive knife 20 is sufficient to withstand a continuous flow of the current. Thus, the electrically conductive knife 20 is configured to withstand a continuous flow of the current.

It is noted that the electrically conductive knife 20 can join the second portion 14 of the line by any means allowing an electrical contact between the main contact 16 and the second portion 14 of the line. Similarly, the main contact 16 can join the earth 50 by any means making it possible to obtain an electrical contact between the main contact 16 and the earth 50. For example, the electrical contact can be obtained by insertion, by impaling or by pinching.

Moreover, a free end of the electrically conductive knife 20, distant from the first portion of the line 12 is configured to drive a part of the shunt branch 18 during the opening movement. The conductive property of the electrically conductive knife 20 allows current to flow into the shunt branch 18.

The electrically insulating element 22 extends parallel to the electrically conductive knife 20. The electrically insulating element 22 is made of an insulating material, for example epoxy, or of any other material that does not conduct electricity. The current does not flow through the electrically insulating element 22. The electrically insulating element 22 drives a part of the shunt branch 18 during the closing movement. The insulating property of the insulating element 22 prevents the current from flowing in the shunt branch 18 during the closing movement.

In the example shown, the electrically insulating element 22 comprises a body 24 and a protuberance 26.

The body 24 is a hollow part which defines a housing for receiving the electrically conductive knife 20. The electrically insulating element 22 thus forms a support element for the electrically conductive knife 20 (also called an "arm"). The electrically insulating element 22 contributes to the dielectric strength between the electrically conductive knife 20 and any other part at the potential of the second portion 14 of the line. The free end of the electrically conductive knife 20, distant from the second portion of the line 14, protrudes from the body 24. The electrically conductive knife 20 can then come into electrical contact with the second portion of the line 14, with the earth 50 and with the shunt branch 18 during the opening movement.

The protuberance 26 extends from the body 24, in a plane substantially with the free end of the electrically conductive knife 20. In this case, the protuberance 26 extends in a plane which is offset with respect to the plane of extension of the electrically conductive knife 20. The protuberance 26 is situated notably in a plane perpendicular to the pivoting axis A. Thus, the protuberance 26 can intervene in the closing movement without being an obstacle to the electrically conductive knife 20 during the opening movement. It is noted that, in an embodiment that is not shown, a protuberance 26 could be provided on either side of the electrically conductive knife 20.

Figure 2:
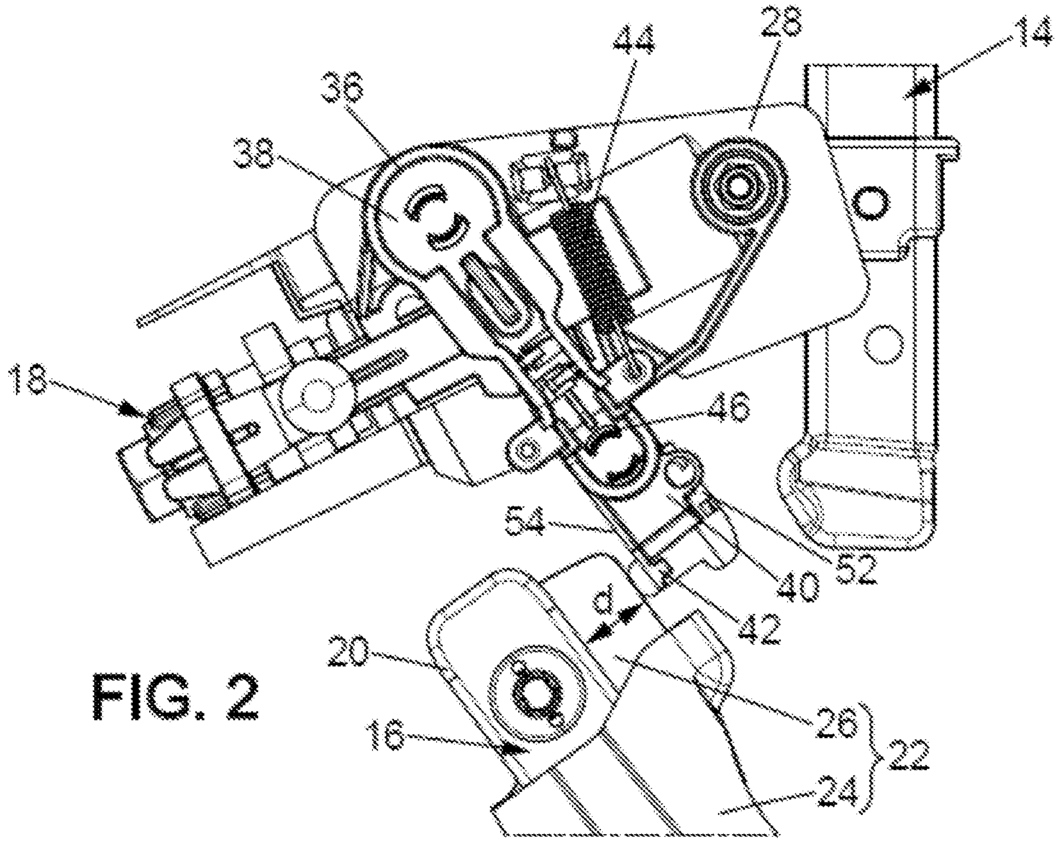
FIG. 2 shows a side view of a detail of FIG. 1 during a closing movement, according to one embodiment.
Figure 3:
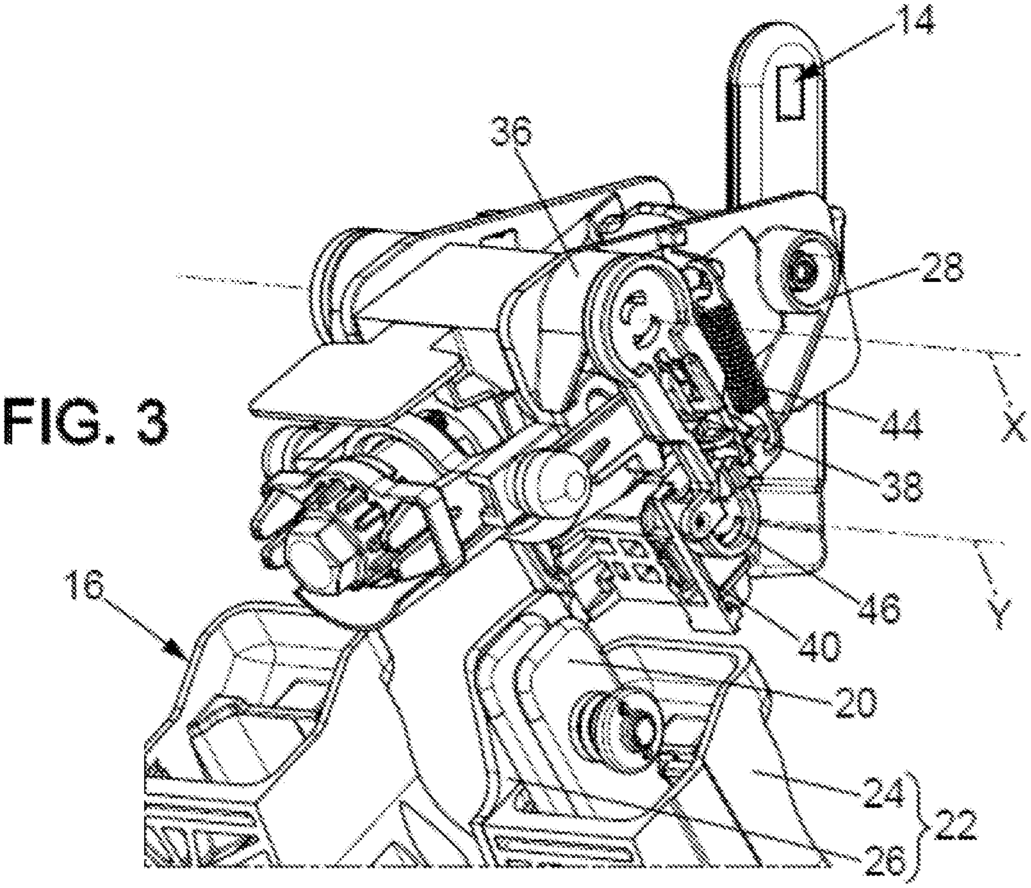
FIG. 3 shows a perspective view of FIG. 2, according to one embodiment.

Seen from the side, and as can be seen in FIG. 2, an edge of the protuberance 26 projects beyond the electrically conductive knife 20 in the direction of the closing movement. A distance d, measured in a plane parallel with the plane of extension of the protuberance 26, between the edge of the protuberance 26 and the edge of the electrically conductive knife 20 is for example between 5 mm and 50 mm. The distance d makes it possible to define an isolation distance between the electrically conductive knife 20 and the shunt branch 18, in order to limit the risk of transmission of the current between electrically conductive knife 20 and the shunt branch 18 during the closing movement. The distance d makes it possible to increase the isolation distance in air and the creepage between the electrically conductive knife 20 and the shunt branch 18.

It is noted and an opposite edge of the protuberance 26 is set back with respect to the electrically conductive knife 20. In the direction of the opening movement, the electrically conductive knife 20 extends beyond the protuberance 26. The protuberance 26 can come into contact with the shunt branch 18 during the closing movement and not intervene in the opening movement.

La protuberance 26 can be an integral part of the body 24, for example by being moulded with the body 24. Alternatively, the protuberance 26 can be a part attached to the body 24. The protuberance 26 can for example be fixed to the body 24 by means of screws. Other fixing means can of course be used for fixing the protuberance 26 on the body 24.

La shunt branch 18 essentially comprises a first part 28 and a second part 36, fitted in a mobile manner to the first part 28. The first and second parts 28, 36 are in electrical continuity.

The first part 28 is fitted on the second portion of the line 14 in order to be in electrical continuity with the second portion of the line 14. The first part 28 comprises a vacuum interrupter 30. In this case, the vacuum interrupter 30 contains a pair of contacts the first of which is dependent on a fixed rod 32, connected to the second portion of the line 14, and the second of which is dependent on a mobile rod 34, connected to the second part 36 of the shunt branch 18. Thus, the vacuum interrupter 30 can be actuated between an open state and a closed state by a movement of the second part 36. When the vacuum interrupter 30 is in the closed state, and during the opening phase where the knife 20 is in contact with the shunt branch 18, the current can pass through the vacuum interrupter 30 and flow into the second portion of the line 14 through the shunt branch 18. When the vacuum interrupter 30 is in the open state, the current does not flow through the vacuum interrupter 30 and the flow of the current through the shunt branch 18 is interrupted.

The second part 36 extends from the first part 28 towards the second portion of the line 12. In a position of rest of the second part 36, the second part 36 is oriented towards the second portion of the line 14, without touching the main contact 16. The current does not flow through the shunt branch 18 and the vacuum interrupter 30 is in the closed state. During the opening movement, the second part 36 is driven by the electrically conductive knife 20 of the main contact 16. The current flows through the shunt branch 18 and the mobile rod 34 is moved in order to actuate the vacuum interrupter 30 into the open state. In a first release position of the second part 36, during the opening movement, the electrically conductive knife 20 releases the second part 36 and the electrical contact between the shunt branch 18 and the electrically conductive knife 20 is broken without the formation of an electric arc. During the closing movement, the second part 36 is driven by the electrically insulating element 22 of the main contact 16. The current does not flow through the shunt branch 18 during the closing movement. In a second release position of the second part 36, during the closing movement, the electrically insulating element 22 releases the second part 36.

In this case the second part 36 is fitted in a rotary manner on the first part 28 about a second pivoting axis X. The second pivoting axis X is parallel with the first pivoting axis A of the main contact 16. The driving of the second part 36 thus corresponds to a rotation of the second part 36 about the second pivoting axis X. The main contact 16 and the second part 36 move in substantially parallel planes, minimising the dimensions of the switch 10.

Moreover, the second part 36 is attached to a resiliently biasing means 44, for example in the form of a spring 44. The resiliently biasing means 44 is attached, on the one hand, to the first part 28 and, on the other hand, to the second part 36 of the shunt branch 18. The resiliently biasing means 44 applies force on the second part 36 towards the position of rest. During the opening movement, the main contact 16 acts against the resiliently biasing means 44, in order to move the second part 36 out of the position of rest. In the first release position, the resilient biasing means 44 returns the second part 36 to the position of rest.

In the example shown, the second part 36 comprises a first arm 38, extending from the first part 28, and a second arm 40 (also called "retractable pallet"). The first arm 38 extends from an end connected to the first part 28 to a free end. The second arm 40 is mounted such that it is partially freely mobile on the free end of the first arm 38.

A stop 46 keeps the second arm 40 in a stopped position, in which the second arm 40 extends in the extension of the first arm 38. During the opening movement, when the main contact 16 acts upon the second part 36 of the shunt branch 18, the second arm 40 is kept in the stopped position and the first and second arms 38, 40 move together. Conversely, during the closing movement, the second arm 40 is not constrained by the stop 46, and the second arm 40 can be driven by the electrically conductive knife 20 of the main contact 16 independently of the first arm 38. The main contact 16 can close the line by moving only the second arm 40, without moving the first arm 36 and therefore not actuating the vacuum interrupter 30 nor causing an electrical contact between the first portion of the line 12 and the shunt branch 18.

Moreover, the second arm 40 can be acted upon by a resiliently biasing means, for example a spring. The second arm 40 can be configured to keep the second arm 40 in the stopped position. During the closing movement, the main contact 16 can move the second arm 40 away from the stopped position. In the second release position, during the closing movement, the second arm 40 can be returned to the stopped position by the resiliently biasing means.

In this case, the second arm 40 is mounted in a rotary manner on the first arm 38, about a third pivoting axis Y. The third pivoting axis Y is parallel with the first and second pivoting axes A, X. During the closing ravel, the driving of the second arm 40 corresponds to a rotation of the second arm 40 about the third pivoting axis Y.

The second arm 40 can comprise an electrically conductive face 52 and an electrically insulating face 54. The conductive face 54 faces the second portion of the line 14 in order to be in contact with the electrically conductive knife 20 of the main contact 16 during the opening movement. The electrically insulating face 54 is opposite to the conductive face 52, in order to come into contact with the electrically insulating element 22 during the closing movement. The insulating face 54 makes it possible to further limit the risk of current flow between the main contact 16 and the shunt branch 18 during the closing movement. In fact, the insulating face 54 makes it possible to increase the isolation distance in air and the creepage between the electrically conductive knife 20 and the conductive face 52.

The second arm 40 can be made of an electrically conductive material. The insulating face 54 can be formed by coating with an insulating material. Alternatively, the second arm 36 can be made of a material that is not electrically conductive. The conductive face 52 can be formed by coating with a conductive material or by a braid extending along the second arm 40.

Moreover, the second arm 40 in this case comprises a protrusion 42 disposed in the vicinity of a free and of the second arm 40. The protrusion 42 faces the protuberance 26 of the electrically insulating element 22, in order to interact, notably by a cam effect, with the electrically insulating element 22 during the closing movement.

Alternatively, the second part 36, and in particular the second arm 40 of the second part 36, can be made entirely of an electrically conductive material. This embodiment notably facilitates the manufacture of the switch 10.

The functioning of the switch 10 is described in more detail below, with reference to FIGS. 4 to 10. FIGS. 4 to 10 are a simplified and diagrammatic representation of the functioning of the switch 10 according to one embodiment.

A separation movement corresponds to the transition of the main contact 16 from the closed position to the open position.

Figure 4:
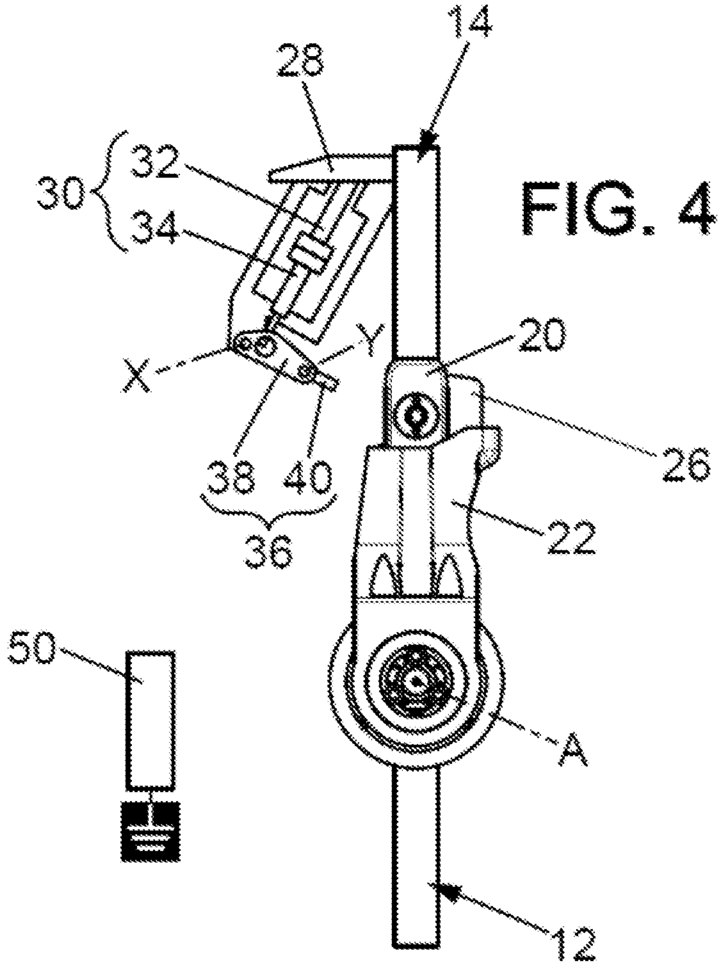
FIG. 4 shows a diagrammatic side view of the switch shown in FIG. 1 in a closed position, according to one embodiment.

As seen in FIG. 4, the main contact 16 is initially in the closed position. The current flows through the electrically conductive knife 20 of the main contact 16. The second part 36 is in the position of rest, oriented towards the second portion of the line 14 without touching the main contact 16. The current does not flow through the shunt branch 18, despite the closed state of the vacuum interrupter 30.

Figure 5:
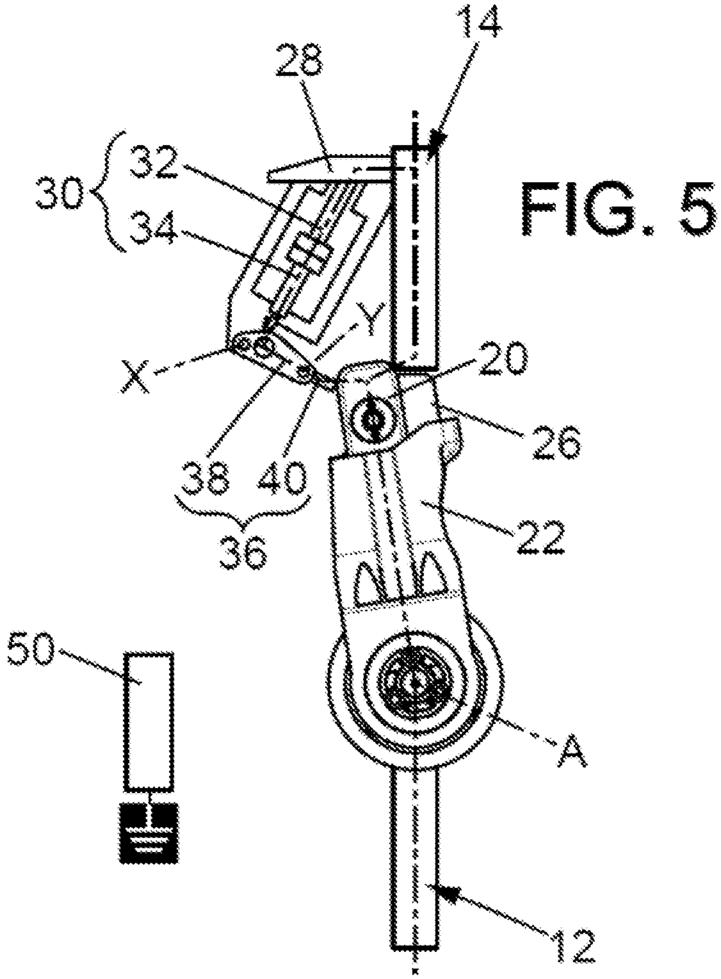
FIG. 5 shows a diagrammatic side view of the switch shown in FIG. 1 during a switching phase of the separation movement, according to one embodiment.

During a phase of switching the current, shown in FIG. 5, the main contact 16 begins to move. The free end of the electrically conductive knife 20 comes into contact with the second part 36 of the shunt branch 18 whilst remaining connected to the second portion of the line 14. The current flows into the second portion of the line 14 through two parallel circuits: directly through the electrically conductive knife 20 and through the electrically conductive knife 20 and the shunt branch 18. During the switching phase, the contacts are at the same electric potential, and no electric arc is formed.

Figure 6:
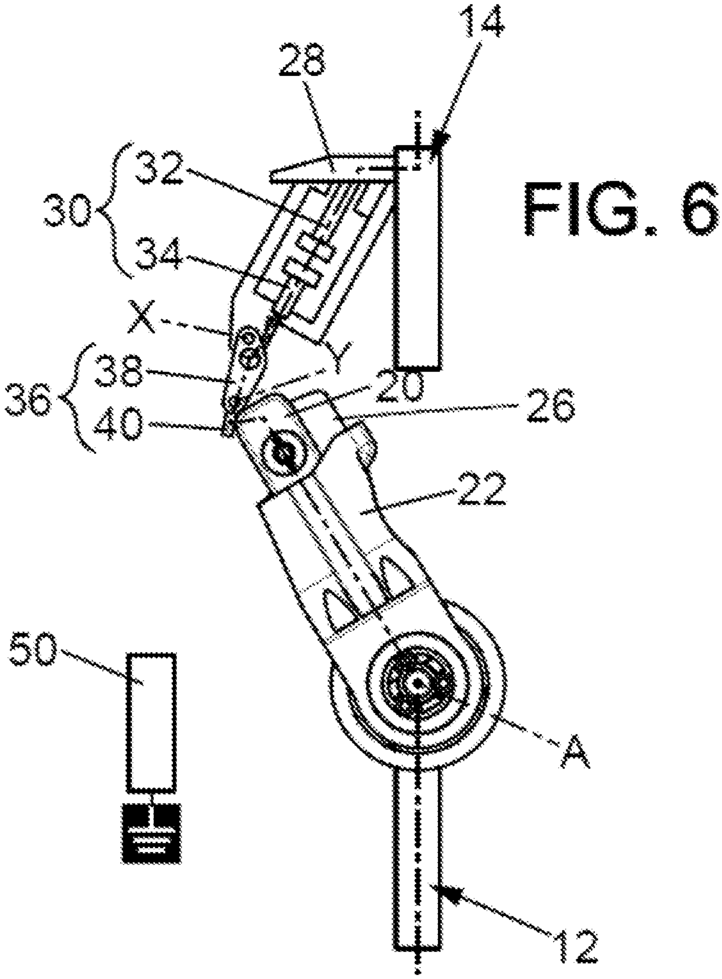
FIG. 6 shows a diagrammatic side view of the switch shown in FIG. 1 during a current breaking phase of the separation movement, according to one embodiment.

During a cut-off phase, shown in FIG. 6, the electrically conductive knife 20 of the main contact 16 is separated from the second portion of the line 14. The current flows into the second portion of the line 14 through the shunt branch 18, passing through the vacuum interrupter 30. The free end of the electrically conductive knife 20 drives the second part 36 whose movement causes the opening of the vacuum interrupter 30. The current is interrupted in the vacuum interrupter 30, preventing the formation of an electric arc between the knife 20 and the second portion of line 14 during the opening movement. The electric arc can in fact be formed in the vacuum interrupter 30.

In the first release position, the electrically conductive knife 20 of the main contact 16 releases the second part 36 of the shunt branch 18. The vacuum interrupter 30 is in the open state, therefore no current passes through the line. The main contact 16 can continue the rotation to the open position, and the spring 44 can return the second part 36 to the position of rest, thus closing the vacuum interrupter 30 again.

Figure 7:
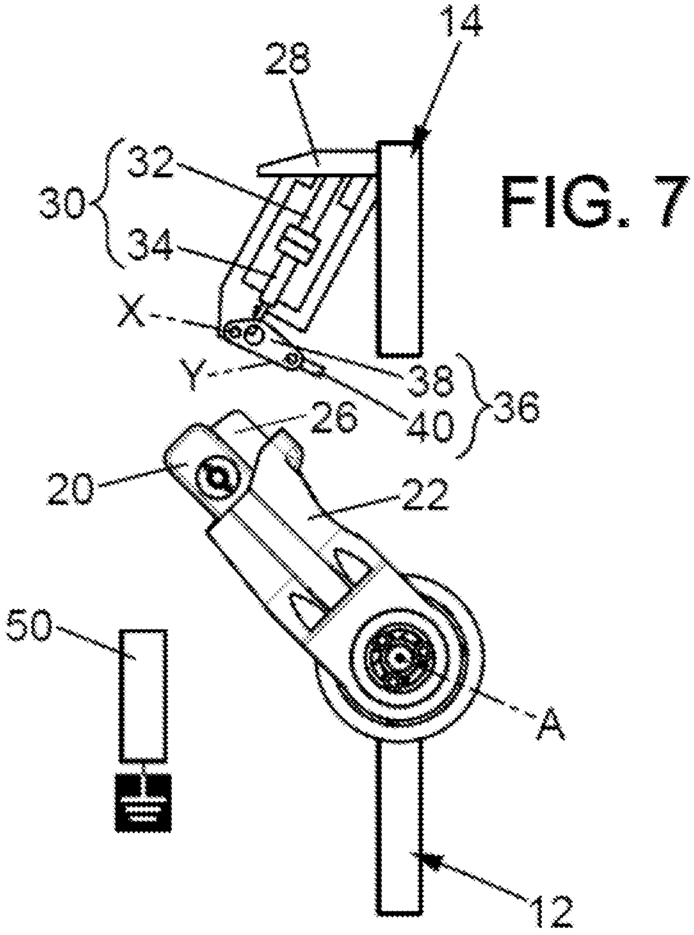
FIG. 7 shows a diagrammatic side view of the switch shown in FIG. 1 in an open position, according to one embodiment.

In the open position, shown in FIG. 7, the main contact 16 is distant from the second portion of the line 14. The current does not flow through the line. The second part 36 of the shunt branch 18 is in the position of rest, and the vacuum interrupter 30 is in the closed state.

The closing movement corresponds to the transition of the main contact 16 from the open position to the closed position.

Figure 8:
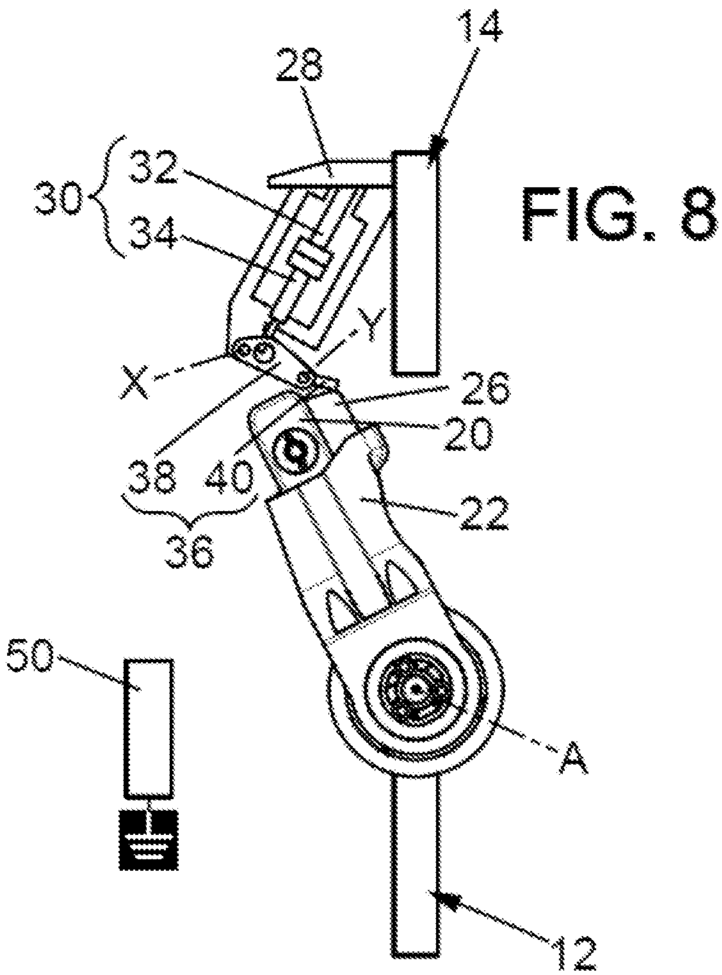
FIG. 8 shows a diagrammatic side view of the switch shown in FIG. 1 during a starting phase of the closing movement, according to one embodiment.

In an engagement phase, shown in FIG. 8, the electrically insulating element 22 comes into contact with the second part 36 of the shunt branch 16. The current does not flow through the shunt branch 18. The second arm 40 of the second part 36 is driven independently of the first arm 38. Thus, the vacuum interrupter 30 is kept in the closed state. In this case, the isolation distance between the electrically conductive knife 20 of the main contact 16 and all of the parts of the shunt branch 18 at the potential of the second portion of line 14 is sufficient to prevent the formation of an arc between the main contact 16 and the shunt branch 18 during the closing movement.

Figure 9:
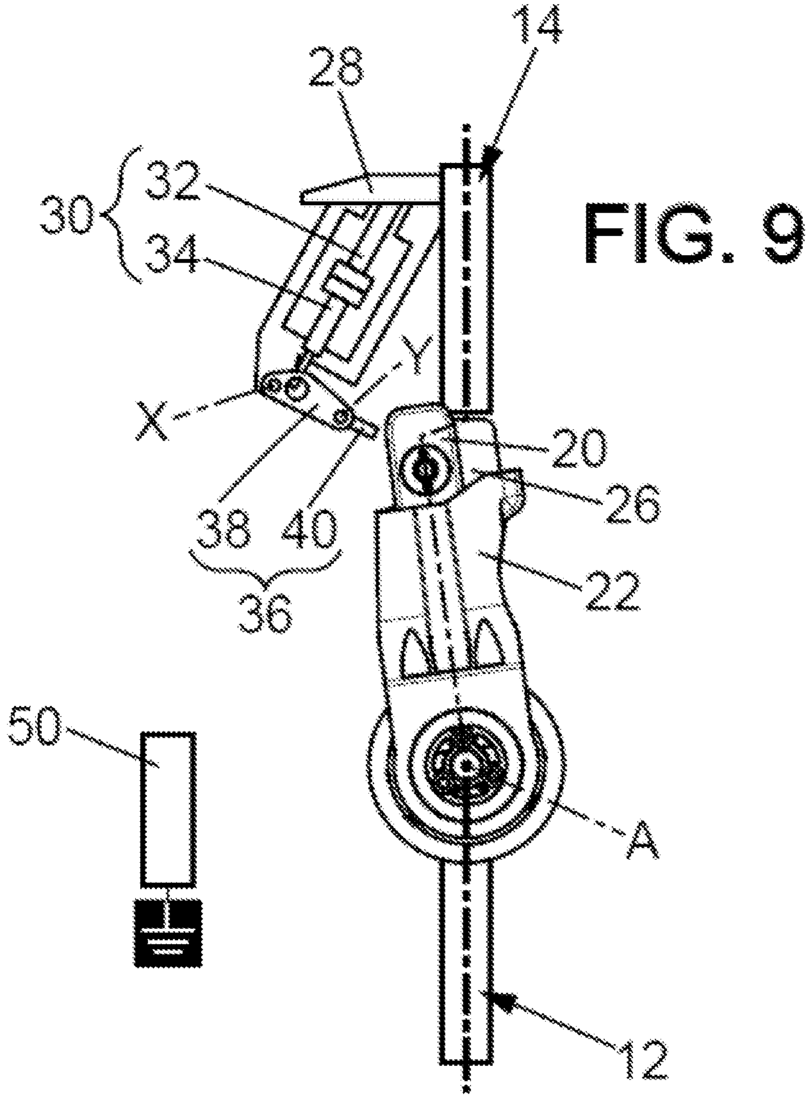
FIG. 9 shows a diagrammatic side view of the switch shown in FIG. 1 in a phase of reestablishment of the current of the closing movement, according to one embodiment.

During a reestablishment of the current phase, shown in FIG. 9, the electrically conductive knife 20 of the main contact 16 joins the second portion of the line 14. The current can flow into the second portion of the line 14 through the electrically conductive knife 20, without passing through the shunt branch 18.

In the second release position, the main contact 16 releases the second arm 40 of the second part 36 of the shunt branch 18. The second arm 40 of the second part 36 returns to the stopped position, notably under the effect of the resiliently biasing means acting on the second arm 40. The switch 10 is again in the closed position shown in FIG. 4.

Figure 10:
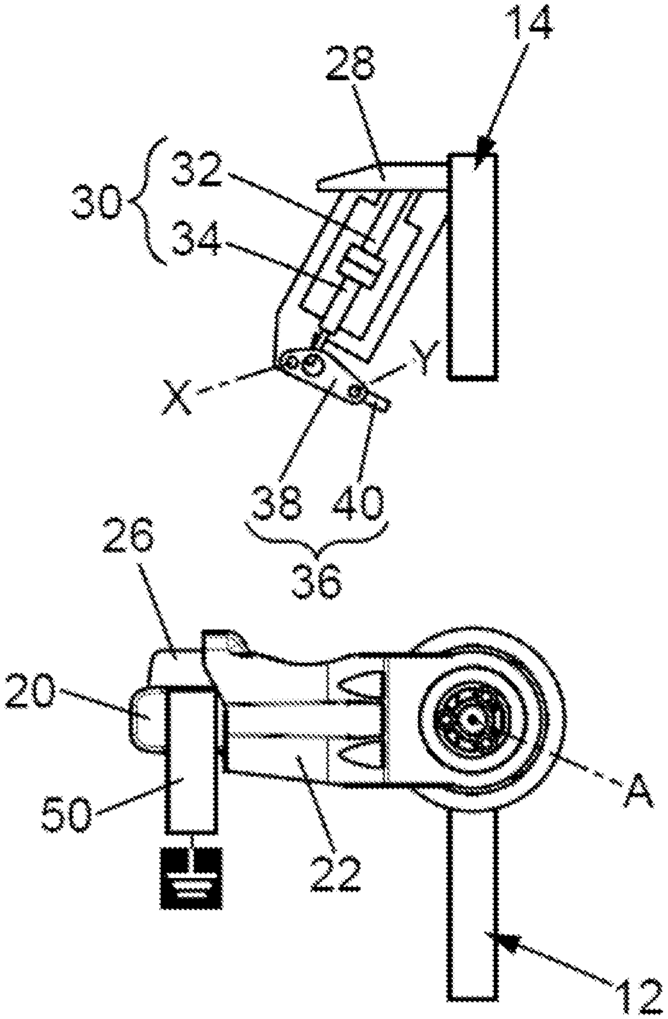
FIG. 10 shows a diagrammatic side view of the switch shown in FIG. 1 in an earthing position, according to one embodiment.

The earthing movement corresponds to the transition of the main contact 16 from the open position to the earthing position. As seen in FIG. 10, the earthing movement corresponds to a continuation of the rotation of the main contact 16 until it comes into electrical contact with the earth 50.

The invention claimed is:

1. A current switch arranged between a first portion of electric line and a second portion of electric line, comprising:

- at least one main contact comprising an electrically conductive knife, and an electrically insulating element, the main contact being fitted in a mobile manner on the first portion of electric line in order to alternatively follow:
  - an opening movement from a closed position in which the main contact is in electrical contact with the second portion of electric line to an open position in which the main contact is distant from the second portion of electric line, and
  - a closing movement from said open position to said closed position;
- at least one shunt branch comprising a first part electrically connected to the second portion of the line, the first part comprising a vacuum interrupter configured to be actuated alternatively between an open state and a closed state, and a second part mounted in a mobile manner on the first part and configured to actuate the vacuum interrupter, the electrically conductive knife and the electrically insulating element being configured so that:

- during the opening movement, the electrically conductive knife acts upon the second part in order to actuate the vacuum interrupter into the open state, and
- during the closing movement, the electrically insulating element acts upon the second part without actuating the vacuum interrupter.

2. The switch according to claim 1, wherein the electrically insulating element is a support element of the electrically conductive knife.

3. The switch according to claim 1, wherein the electrically insulating element comprises:

- a body forming a housing for the knife of the main contact, a free end of the electrically conductive knife protruding from the body; and
- a protuberance extending from the body, said protuberance being disposed to come into contact with said second part during the closing movement.

4. The switch according to claim 3, wherein the protuberance extends in a plane axially offset from a general plane of extension of the electrically conductive knife.

5. The switch according to claim 3, wherein the protuberance is an integral part of the body.

6. The switch according to claim 3, wherein the protuberance is a part attached to the body.

7. The switch according to claim 1, wherein the second part comprises an electrically conductive face and an electrically insulating face, the electrically conductive face and the insulating face being opposite to each other.

8. The switch according to claim 1, wherein the second part comprises:

- a first arm fitted in a mobile manner on the first part, and
- a second arm fitted in a mobile manner on a free end of the first arm.

9. The switch according to claim 8, wherein the second arm comprises a protrusion adapted to come into contact with the electrically insulating element during the closing movement.

10. The switch according to claim 8, wherein the shunt branch further comprises a stop adapted to keep the second arm in a stopped position in which the second arm extends in the prolongation of the first arm during the opening movement.

11. The switch according to claim 8, wherein the second arm is made of an electrically conductive material.

12. The switch according to claim 1, wherein the main contact is fitted in a pivoting manner on the first portion of the line about a first pivoting axis, the second part of the shunt branch being fitted in a pivoting manner on the first part of the shunt branch about a second pivoting axis, the first pivoting axis being parallel with the second pivoting axis.

13. The switch according to claim 1, wherein the shunt branch comprises a spring fitted between the first part and the second part, the spring being adapted to drive the second part towards a rest position, in which the vacuum interrupter is in the closed state.

14. The switch according to claim 1, wherein the main contact is also adapted to follow an earthing movement from the open position to an earthed position, the knife of the main contact being in electrical contact with an earth when the main contact is in said earthed position.

15. A three-phase switching device comprising at least one switch according to claim 1.

* * * * *